United States Patent
Pessi

(10) Patent No.: US 7,627,692 B2
(45) Date of Patent: Dec. 1, 2009

(54) MULTIPLEXING OF COMPRESSED CONTROL AND USER-PLANE MESSAGES

(75) Inventor: Pekka Pessi, Helsinki (FI)

(73) Assignee: Nokia Corporation, Espoo (FI)

( * ) Notice: Subject to any disclaimer, the term of this patent is extended or adjusted under 35 U.S.C. 154(b) by 712 days.

(21) Appl. No.: 10/768,343

(22) Filed: Jan. 30, 2004

(65) Prior Publication Data
US 2005/0172032 A1 Aug. 4, 2005

(51) Int. Cl.
*G06F 15/16* (2006.01)
(52) U.S. Cl. .................. 709/246; 709/227; 709/237
(58) Field of Classification Search ............. 709/246
See application file for complete search history.

(56) References Cited

U.S. PATENT DOCUMENTS

| 5,258,983 | A | 11/1993 | Lane et al. | |
|---|---|---|---|---|
| 6,421,734 | B1 * | 7/2002 | Nessett et al. | 709/247 |
| 7,154,907 | B2 * | 12/2006 | Poikselka et al. | 370/465 |
| 7,213,143 | B1 * | 5/2007 | Watson et al. | 713/151 |
| 2006/0075134 | A1 * | 4/2006 | Aalto et al. | 709/238 |

FOREIGN PATENT DOCUMENTS

EP 0 494 576 10/1996

OTHER PUBLICATIONS

Signaling Compression (SigComp), www.faqs.org., R. Price, et al., Jan. 2003, pp. 1-44.
Campell, et al.; The Message Session Relay Protocol, Internet Draft of the Internet Engineering Task Force, The Internet Society, Oct. 23, 2003, List of current Internet Drafts can be accessed at http//www.ietf.org/ietf/lid-abstracts,txt.
Price, et al.; Signaling Compression (SigComp); The Internet Society, Jan. 2003.

* cited by examiner

*Primary Examiner*—George C Neurauter, Jr.
*Assistant Examiner*—Kishin G Belani
(74) *Attorney, Agent, or Firm*—Banner & Witcoff, Ltd.

(57) ABSTRACT

A method, device, system, and a computer program product where compressed control and user-plane messages are multiplexed. The multiplexing of such messages involves distinguishing between control messages and user-plane messages using an identifier accompanying the control messages. The identifier signals an intermediate relay that a particular message is a control message and should be decompressed and processed.

17 Claims, 3 Drawing Sheets

MULTIPLEXING OF COMPRESSED CONTROL AND USER-PLANE MESSAGES

FIELD OF THE INVENTION

The present invention relates to techniques for end-to-end SigComp compression on a session with intermediate relays.

BACKGROUND OF THE INVENTION

The Signaling Compression (SigComp) compression protocol (RFC 3320) defines a universal decompression virtual machine (UDVM) and a compression state handler run by a decompressor. SigComp provides a safe environment where the compressing party can ask the decompressor to execute a decompression program and store a decompression state.

FIG. 1 illustrates two variants of a SigComp message format. A format 12 can include a header section 14, a returned feedback section 16, a partial state identifier section 18, and a remaining SigComp message section 20. The format 12 uses an existing bytecode program. A format 22 can include a header section 24, a returned feedback section 26, a code and destination section 27, a UDVM bytecode section 28, and a remaining SigComp message section 30. The format 22 includes the bytecode within the message.

The decompression programs are written with the UDVM bytecode. The UDVM bytecode can either be sent within a SigComp message or it can be stored in the decompressor. Bytecode that is stored in the decompressor can be referenced by its identifier, a 6 to 20 byte long hash of bytecode. A compression algorithm can be readily available in every decompressor, and it can be used by simply specifying a hash code identifying it.

The SigComp message can be either self-contained or it may refer to states within the decompressor. A self-contained message can be statelessly decompressed. The compressor can get feedback from its UDVM decompressor program. The returned feedback can be piggy-backed as a cookie in the SigComp message sent by the peer compressor.

FIG. 2 illustrates an example of a SigComp communication system 33. In the communication system 33, a device A is a device B's peer and the device B is the device A's peer. For instance, if the compressor in device A wants to get feedback, it includes the instructions to get it in a bytecode program which it sends to device B. The device B executes the bytecode, and gets a request from device A's bytecode to send a feedback item to the device B. The device B does not need to understand the meaning of feedback item, it is just a cookie. When the device B sends a message to the device A, it attaches the feedback cookie to its own message.

The decompressor can provide information about its parameters (e.g., supported SigComp version, allowed bytecode execution cycles, available memory size, etc) to the compressor. This parameter information is included in the bytecode. For instance, if device B wants to give its UDVM parameters to the device A, it includes appropriate instructions in the bytecode it will send to device A. The bytecode instructions then generates a well-known returned parameters structure that describes device B's capabilities, and passes it to the device A's UDVM.

The SigComp decompression algorithm enhances compression by using dictionaries. These dictionaries can be static or dynamic. Static dictionaries are either well known or uploaded by the compressor. Dynamic dictionaries are updated by the decompression algorithm. A decompression algorithm can, for instance, store the message headers to the dictionary, so when a next message is sent, the headers can be referenced efficiently.

The messaging session relay protocol (MSRP) is a simple means for exchanging Multipurpose Internet Mail Extensions (MIME) messages between two endpoints. Between the endpoints there can be up to two messaging relays. The relays make it possible to establish a messaging session through middleboxes (firewalls, NATS, etc.).

FIG. 3 illustrates communication between the device A and the device B via relays $R_A$ and $R_B$. The messaging session protocol in a communication session is transaction-based (request/response). A session carries two kind of request messages: (1) control messages used to establish and authenticate messaging sessions with relays, and (2) user requests messages that actually carry instant messages between endpoints. The relays are typically interested only in control messages. When a messaging session is uncompressed, the relay can determine the type (control or user) of the incoming request. The first few bytes of the message contains the request type and the size of the message. The user messages can simply be forwarded to the outgoing connection without further inspection.

FIG. 4 illustrates one of the limitations of conventional intermediate elements, or relays, during a messaging session. The messaging stream consists of two kind of messages, control messages that are processed by the relays and end-to-end user messages that are processed only by the endpoints. If the messaging session is compressed, the relays have to decompress using a decompressor (D) and re-compress using a compressor (C) the messaging stream that flows through them. A relay cannot pass compressed messages through as they have to determine the type of each message. In order to efficiently decompress all messages, they have to maintain separate compression contexts with every endpoint. With a large number of messaging sessions flowing through them, this may require disproportionate amount of resources.

FIG. 5 illustrates a SIP (Session Initiation Protocol system where it is possible to compress the message body end-to-end. If hop-by-hop compression is used, the message headers are compressed using hop-by-hop and the compression is applied to the message body twice. It is possible to partially solve the problem by only compressing the low-bandwidth links. Nevertheless, such a solution to the inefficiencies of a SigComp communication system is limited to the scenario where uncompressed messages can be transmitted.

Thus, there is a need to avoid resource-intensive decompression and compression SigComp systems and methods. Further, there is a need to simplify SigComp states of relays. Even further, there is a need to put multiple user messages in one SigComp message and multiplex control and user-plane messages.

SUMMARY OF THE INVENTION

The present invention is directed to a method, device, system, and a computer program product where compressed control and user-plane messages are multiplexed. The multiplexing of such messages involves distinguishing between control messages and user-plane messages using an identifier accompanying the control messages. The identifier signals an intermediate relay that a particular message is a control message and should be decompressed and processed.

Briefly, one exemplary embodiment relates to a method for communicating messages using a compression protocol. The method includes detecting control messages at a communication intermediary from a compressed stream of messages, decompressing the detected control messages at the communication intermediary, and passing user messages from the compressed stream of messages through the communication intermediary without modifications.

Another exemplary embodiment relates to a device that communicates messages using a compression protocol. The device includes an input that receives messages, an output that transmits messages, and a processor that detects control messages included in the messages received by the input. The processor decompresses the control messages and directs non-control messages to be communicated through the output without modification.

Yet another exemplary embodiment relates to a system for communicating messages using a compression protocol. The system includes a first communication device having a compressor and a decompressor, a second communication device having a compressor and a decompressor, and an intermediate relay between the first communication device and the second communication device that detects and decompresses control messages in messages communicated from the first communication device, and passes user messages through to the second communication device without decompression.

Even another exemplary embodiment relates to a computer program product that has computer code to detect control messages at a communication intermediary from a stream of messages, decompress the detected control messages at the communication intermediary, and communicate user messages from the stream of messages through the communication intermediary without modification.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION OF EXEMPLARY EMBODIMENTS

Figure 6:
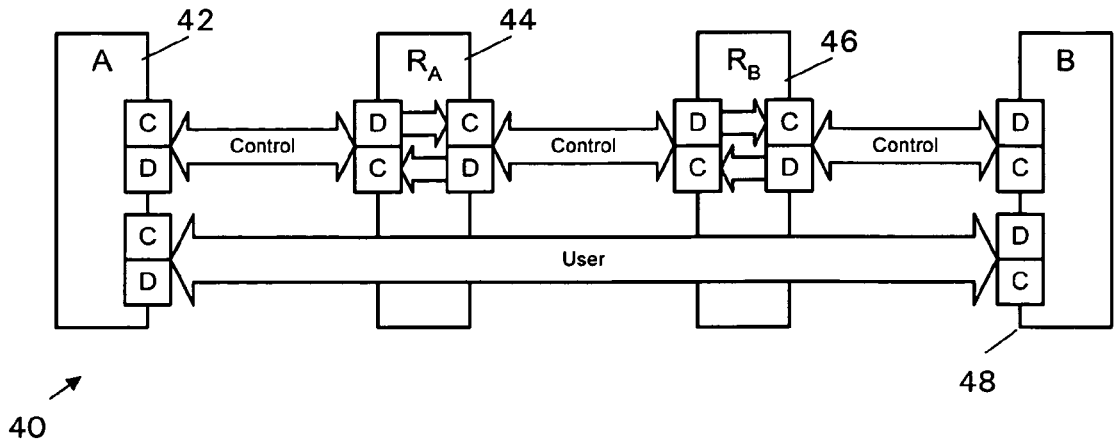
FIG. 6 is a diagrammatic representation depicting intermediate relays passing end-to-end messages unmodified through them in accordance with an exemplary embodiment.

FIG. 6 illustrates a device 42 communicating via intermediate relays 44 and 46 to a device 48 where the intermediate relays 44 and 46 can pass end-to-end messages unmodified through them. The intermediate relays 44 and 46 detect the hop-by-hop (control) messages from the compressed stream and decompress them. The relays 44 and 46 pass the user messages through without modifications.

In an exemplary embodiment, the device 42 marks individual compressed messages in the messaging session so that the intermediate relays 44 and 46 on the session can pass through uninteresting (user plane) messages and uncompress only the interesting (control plane) messages. Control messages can be compressed hop-by-hop, user messages end-to-end.

Figure 7:
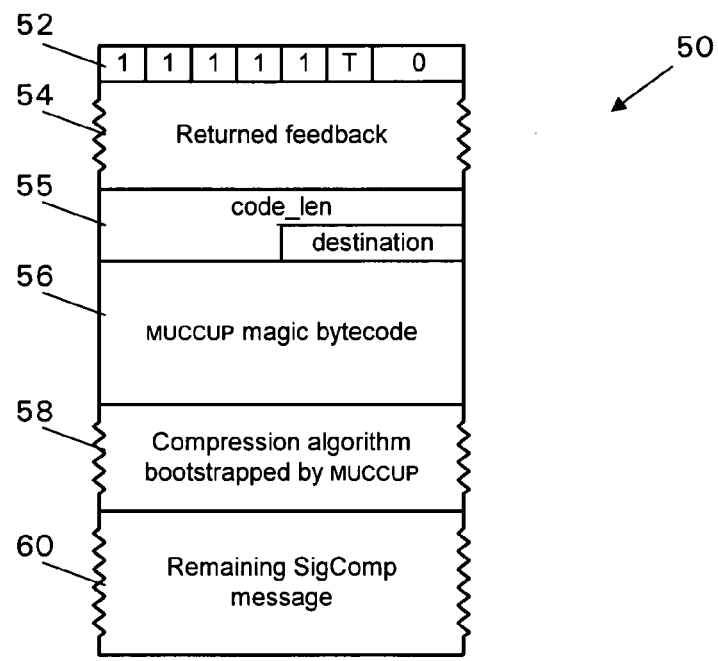
FIG. 7 is a diagrammatic representation depicting a message having a byte code pattern at the beginning of a message in accordance with an exemplary embodiment.

FIG. 7 illustrates a message 50 according to an exemplary embodiment. The message 50 can include a header section 52, a returned feedback section 54, a code and destination section 55, a MUCCUP bytecode section 56, a compressed algorithm 58 bootstrapped by MUCCUP, and a remaining SigComp message section 60. Conventional SigComp message formats do not have a ready multiplexing identifier (a port number, for instance). According to an exemplary embodiment, the MUCCUP bytecode section 56 includes a multiplex identifier. MUCCUP refers to Multiplexing of Compressed Control and User-Plane messages. The MUCCUP bytecode is a UDVM program that does not create or access decompression states in the relays. The compressed control messages that relays need to uncompress always carry the MUCCUP bytecode. The bytecode forms a "magic pattern" that can be used to detect control messages.

Relays 44 and 46 know if its peer supports the MUCCUP bytecode from the first SigComp message sent by the peer. If the peer uses the MUCCUP bytecode in the first message, the relays compress all the control-plane messages using MUCCUP. When a Message Session Relay Protocol (MSRP) relay sees a subsequent SigComp message without the MUCCUP bytecode, it relays the message through unmodified. If the MUCCUP bytecode is there, the relay decompresses the message. If the control messages are used only at the beginning of the session, the relay can go into forwarding mode after initial control messages have been exchanged.

In alternative embodiments, the MUCCUP bytecode can be used to distinguish hop-by-hop messages and end-to-end messages. End-to-end control messages can be compressed end-to-end, too. The MUCCUP bytecode can be standalone, decompressing the control messages, or it can load the actual compression algorithm and start executing it.

Figure 1:
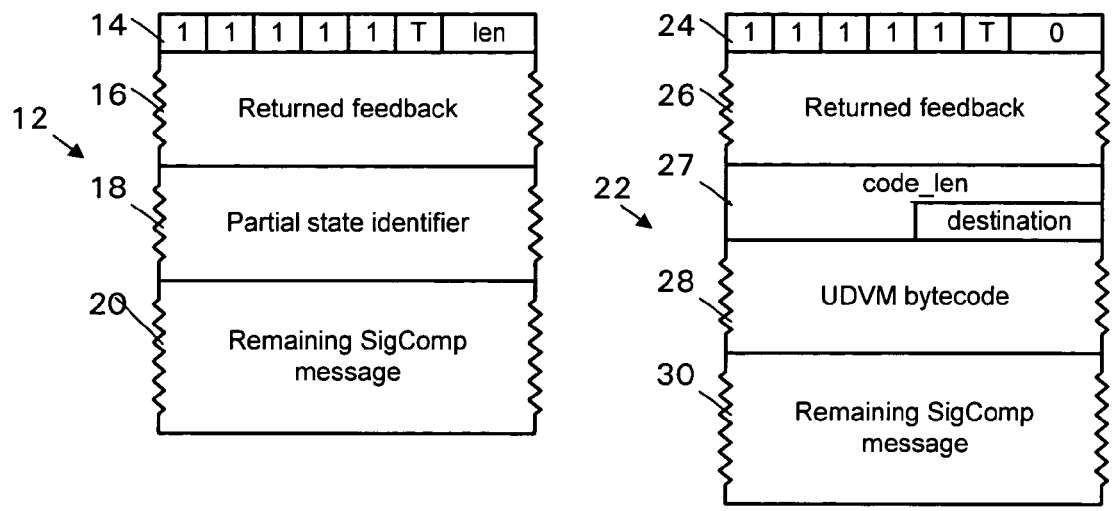
FIG. 1 is a diagrammatic representation of two variants of SigComp message format.
Figure 2:
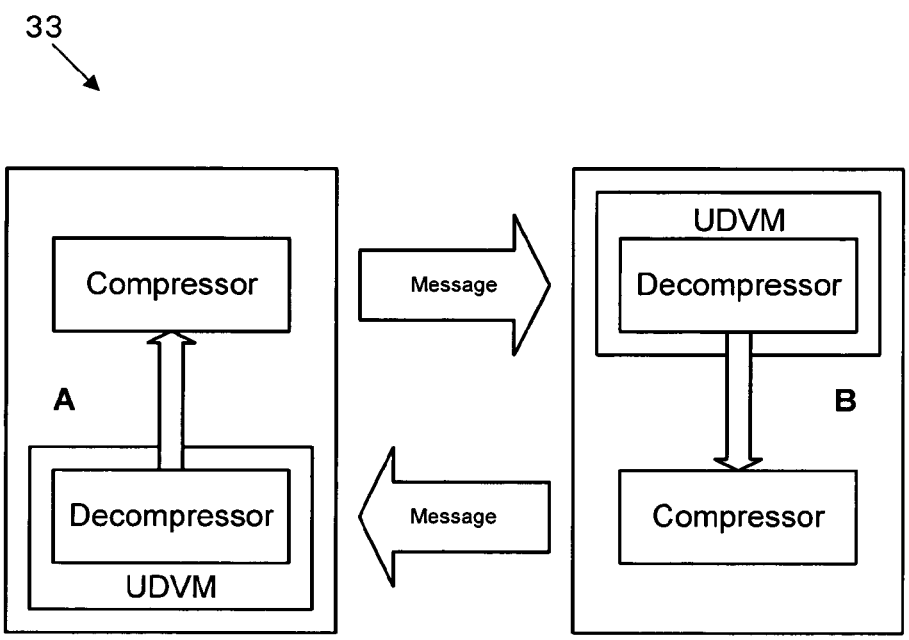
FIG. 2 is a diagrammatic representation of communication devices with compressors and decompressors working in a peer relationship.
Figure 3:
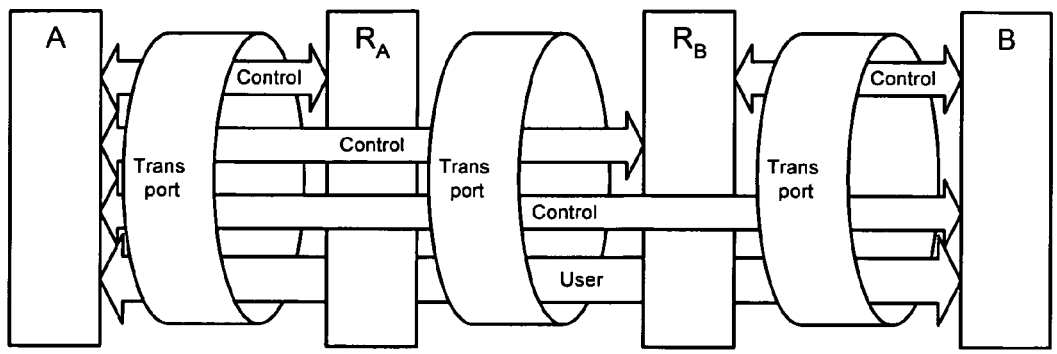
FIG. 3 is a diagrammatic representation depicting relay protocol in a communication system where control messages set up connections and control relays and user messages travel end-to-end.
Figure 4:
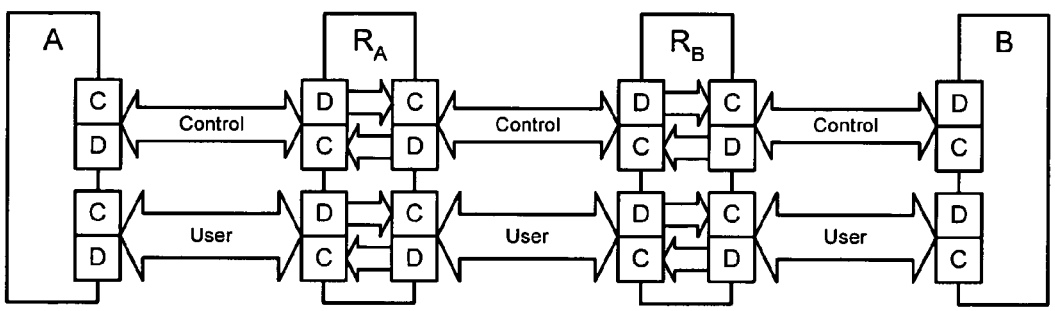
FIG. 4 is a diagrammatic representation depicting the compression of a relay protocol in which each relay must decompress and re-compress each message it relays.
Figure 5:
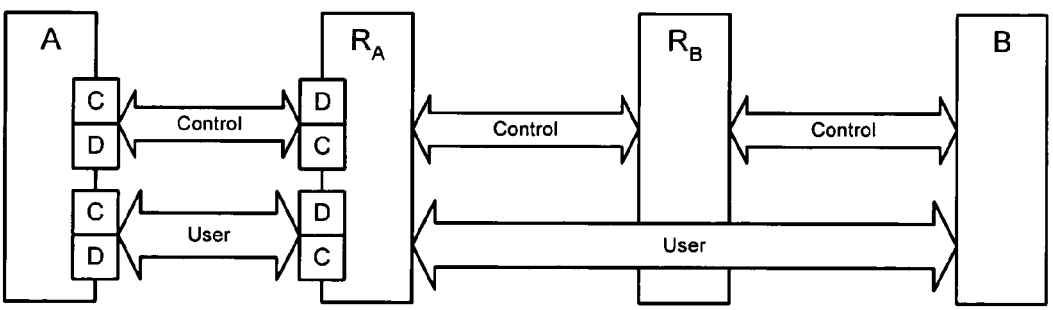
FIG. 5 is a diagrammatic representation depicting a communication system where only one communication link with a relay is compressed.

Referring back to FIG. 1, the format 12 has the partial state identifier section 18. In an alternative embodiment, the partial state identifier contained in the partial state identifier section 18 can be used as a MUCCUP pattern. Such a partial state identifier can refer to an actual MUCCCUP bytecode. The bytecode can be well-known and locally available in the relays.

If the SigComp techniques used on a messaging session supports multiplexing of compressed and uncompressed messages, it is possible to send control-plane messages uncompressed and user-plane messages compressed. Further, transition from uncompressed to compressed can be signaled using control messages. All the MSRP messages in a messaging session may be uncompressed, but the user-plane messages may contain SigComp messages in themselves. In other words, the SigComp messages are tunneled through a messaging session.

There are many alternatives for using the MUCCUP bytecode. For instance, the MUCCUP bytecode can be included in the list of locally available states, the peer may include a specific bit pattern in the returned feedback item, or it may include a special bit pattern in the beginning of the "remaining SigComp message" field. The peer can even include the MUCCUP bytecode in the first message. It is also possible to signal support with external means, for instance, using an SDP attribute.

This detailed description outlines exemplary embodiments of a method, device, system, and a computer program product for multiplexing compressed control and user-plane messages. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method comprising:
   receiving a stream of messages at a communication intermediary, the stream including two independently compressed types of multiplexed messages, the first type of compressed message being a control message, the second type of compressed message being an user message;
   detecting the control message at the communication intermediary from the stream of messages;
   decompressing the detected control message at the communication intermediary; and
   passing user messages from the stream of messages through the communication intermediary without modifications, wherein the user message is not decompressed at any point between a first end device and a second end device.

2. The method claim 1, wherein the control message comprises a multiplex identifier for indicating the multiplexing of the control message and the user message.

3. The method of claim 2, wherein the multiplex identifier is located at the beginning of a communication session.

4. The method of claim 2, wherein detecting the control message at the communication intermediary from the stream of messages comprises detecting the multiplex identifier.

5. The method of claim 2, wherein the user message is a message without the multiplex identifier.

6. The method of claim 1, wherein the control message is a hop-by-hop message and the user message is an end-to-end message.

7. The method of claim 1, wherein the control message comprises a multiplexing of compressed control and user-plane messages (MUCCUP) bytecode section.

8. The method of claim 7, wherein the MUCCUP bytecode section comprises a detectable pattern, wherein the detectable pattern indicates the presence of a control message.

9. The method of claim 7, further comprising:
   determining if the MUCCUP byte code section is used in the control message; and
      in response to determining that the MUCCUP byte code section is used, compressing all control-plane messages using the MUCCUP;
      in response to determining that the MUCCUP byte code section is not used, not compressing all control-plane messages using the MUCCUP.

10. The method of claim 9, wherein after determining that the MUCCUP byte code section is used in the control message, the method further comprises:
    receiving a subsequent message;
    relaying the subsequent message without modification if the subsequent message does not include the MUCCUP byte code; and
    decompressing the subsequent message if the subsequent message includes the MUCCUP byte code.

11. A apparatus comprising:
    an input configured to receive a stream of messages originating from a first end device intended for a second end device, the stream including two independently compressed types of multiplexed messages, the first type of compressed message being a control message, the second type of compressed message being an user message;
    an output configured to transmit messages intended for the second end device;
    a processor configured to detect the control message included in the stream of messages received by the input, wherein the processor is further configured to decompress the control message and direct the user message from the stream of messages to be communicated through the output without modification, wherein the user message is not decompressed at any point between the first end device and the second end device.

12. The apparatus of claim 11, wherein the processor is configured to detect the control message by identifying a special bytecode for indicating the multiplexing of the control message and the user message contained in the control message.

13. The apparatus of claim 11, wherein the control message is used at the beginning of a session and the processor is configured to enter a forwarding mode after the control message is received.

14. The apparatus of claim 11, wherein the modification comprises decompression.

15. A system comprising:
    a first end device comprising a compressor and a decompressor;
    a second end device comprising a compressor and a decompressor; and
    an intermediate relay configured to receiving a stream of messages at a communication intermediary, the stream including two independently compressed types of multiplexed messages, the first type of compressed message being a control message, the second type of compressed message being an user message, wherein the intermediate relay is further configured to detect and decompress the control message in the stream of messages originating from the first end device, and pass the user message intended for the second end device through without decompression, wherein the user message is not decompressed at any point between the first end device and the second end device.

16. The system of claim 15, wherein the intermediate relay is configured to detect control messages by detecting an identifier for indicating the multiplexing of the control message and the user message located in the stream of messages.

17. The system of claim 15, wherein the intermediate relay is configured to enter forwarding mode after the control message is received.

* * * * *